US012180859B2

(12) United States Patent
Barrett, II et al.

(10) Patent No.: US 12,180,859 B2
(45) Date of Patent: Dec. 31, 2024

(54) NOZZLE SEGMENT FOR USE WITH MULTIPLE DIFFERENT TURBINE ENGINES

(71) Applicant: GE Infrastructure Technology LLC, Greenville, NC (US)

(72) Inventors: Norman Andrew Barrett, II, Greenville, SC (US); Joe T. Brown, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/163,079

(22) Filed: Feb. 1, 2023

(65) Prior Publication Data

US 2024/0254887 A1 Aug. 1, 2024

(51) Int. Cl.
*F01D 9/04* (2006.01)

(52) U.S. Cl.
CPC .......... *F01D 9/042* (2013.01); *F05D 2220/32* (2013.01); *F05D 2230/60* (2013.01); *F05D 2240/128* (2013.01)

(58) Field of Classification Search
CPC ..... F01D 9/00; F01D 9/02; F01D 9/04; F01D 9/041; F01D 9/042; F05D 2230/60; F05D 2230/64; F05D 2260/30; F05D 2240/128; F05D 2220/32
See application file for complete search history.

(56) References Cited

U.S. PATENT DOCUMENTS

| | | | | |
|---|---|---|---|---|
| 3,365,173 | A | 1/1968 | Lynch et al. | |
| 5,232,340 | A * | 8/1993 | Morgan | F01D 9/042 415/209.2 |
| 6,296,443 | B1 * | 10/2001 | Newman | F01D 25/246 415/189 |
| 6,375,415 | B1 | 4/2002 | Burdgick | |

(Continued)

FOREIGN PATENT DOCUMENTS

EP 3816405 A1 5/2021

OTHER PUBLICATIONS

Partial Search Report for EP application No. 24150953.8 mailed May 24, 2024; 15 pps.

(Continued)

*Primary Examiner* — Elton K Wong
(74) *Attorney, Agent, or Firm* — Armstrong Teasdale LLP

(57) ABSTRACT

A nozzle segment includes an inner band, an outer band, and at least one nozzle vane extending between the inner and outer bands. The outer band includes a hook that extends radially outwardly from an outer surface. The hook is oriented to couple to a support within different first and second turbine engines. The hook extends circumferentially across the outer surface and includes slots defined therein. A first slot includes a first circumferential load surface, and a second slot includes a second circumferential load surface. When the nozzle segment is coupled within the first turbine engine, the first circumferential load surface engages an anti-rotation element while the second circumferential load (Continued)

surface does not engage an anti-rotation element. When the nozzle segment is coupled within the second turbine engine, the second circumferential load surface engages an anti-rotation element while the first circumferential load surface does not engage an anti-rotation element.

20 Claims, 6 Drawing Sheets

(56) References Cited

U.S. PATENT DOCUMENTS

| | | | | |
|---|---|---|---|---|
| 6,494,677 | B1 | 12/2002 | Grady | |
| 8,157,515 | B2 | 4/2012 | Bailey et al. | |
| 10,465,559 | B2 | 11/2019 | Vu et al. | |
| 10,724,404 | B2 * | 7/2020 | Takamura | F01D 25/246 |
| 11,041,392 | B2 | 6/2021 | Carr et al. | |
| 2003/0068225 | A1 | 4/2003 | Housley et al. | |
| 2010/0047056 | A1 * | 2/2010 | Lee | F01D 25/12 415/115 |
| 2010/0064516 | A1 | 3/2010 | Spracher et al. | |
| 2012/0134791 | A1 | 5/2012 | Brunt et al. | |
| 2015/0226075 | A1 * | 8/2015 | Aoki | F01D 25/246 415/209.3 |
| 2016/0047259 | A1 | 2/2016 | Banks et al. | |
| 2020/0072085 | A1 * | 3/2020 | Sombounkhanh | F01D 9/041 |

OTHER PUBLICATIONS

European Search Report received in 24150953.8 on Jul. 12, 2024; 7 pps.

* cited by examiner

NOZZLE SEGMENT FOR USE WITH MULTIPLE DIFFERENT TURBINE ENGINES

BACKGROUND

The field of the present disclosure relates generally to turbine engines and, more particularly, to a turbine component that is compatible with, and configured for use with, multiple, different turbine engines.

Gas turbine engines are widely used in industrial and power generation operations. A conventional gas turbine engine includes a compressor section, a combustor section downstream from the compressor section, and a turbine section downstream from the combustor section. A working fluid, such as ambient air, flows into the compressor section where it is compressed before being channeled into the combustor section. The compressed working fluid is mixed with a fuel and burned within the combustor section to generate combustion gases that expand through the turbine section. The turbine section includes a stationary nozzle assembly including an annular array of nozzle segments that are contoured to direct the combustion gases towards turbine blades spaced circumferentially about a rotor. The combustion gases impact the turbine blades and cause rotation of the rotor to produce electricity.

In directing the combustion gases towards downstream turbine blades, the nozzle segments must resist the mechanical, vibrational, and thermal loadings of the combustion gases. Each nozzle segment includes one or more vanes that are coupled to an inner support and to an outer support extending circumferentially within the turbine section. Typically, the nozzle segments each include an outer band that is formed at and that extends at a radially outer end of the vanes. The outer band includes a hook configuration that engages with, and couples, the vanes to a railing of the outer support. In some known turbine engines, the hook configuration includes slots that align with anti-rotation elements (e.g., blocks, pins, or lugs) formed on the outer support to facilitate preventing circumferential movement of the nozzle segments. The slots also provide "Murphy-proofing" during assembly of the turbine assembly because the slots prevent the nozzle segments from being inadvertently installed upside down and/or in the wrong type of engine mainframe, and as such reduce opportunities for error, misuse, and/or failure associated with installation and operation of the nozzle segments within the turbine engine. However, because of the Murphy-proofing capability of known nozzle segments, facilities that perform work on multiple types of turbine engines must maintain an inventory of multiple types of nozzle segments.

BRIEF DESCRIPTION

In one aspect, a nozzle segment for use with a turbine engine includes an inner band, an outer band, and at least one nozzle vane that extends radially between the inner and outer bands. The outer band includes an inner surface and an outer surface opposite the inner surface. The nozzle segment also includes a hook that extends radially outwardly from the outer surface and that extends circumferentially across the outer surface. The hook is oriented to selectively couple to a first support within a first turbine engine and to a second support within a second turbine engine. The hook includes slots defined therein. A first of the slots includes a first circumferential load surface, and a second of the slots includes a second circumferential load surface. When the nozzle segment is coupled within the first turbine engine, the first circumferential load surface engages an anti-rotation element within the first turbine engine while the second circumferential load surface does not engage an anti-rotation element. When the nozzle segment is coupled within the second turbine engine, the second circumferential load surface engages an anti-rotation element within the second turbine engine while the first circumferential load surface does not engage an anti-rotation element.

In another aspect, a nozzle segment for use with a turbine engine includes an inner band, an outer band, and a pair of nozzle vanes that extend radially between the inner and outer bands. The outer band includes an inner surface and an outer surface opposite the inner surface. The nozzle segment also includes a first hook that extends radially outwardly from the outer surface and that extends circumferentially across the outer surface. The first hook is oriented to couple to a support within a turbine engine. Slots are defined in the first hook. A first of the slots includes a first circumferential load surface, a second of the slots includes a second circumferential load surface, and a third of the slots includes a third circumferential load surface. When the nozzle segment is coupled within the turbine engine, at least one of the first circumferential load surface, the second circumferential load surface, and the third circumferential load surface engages an anti-rotation element.

In another aspect, a method of assembling a turbine engine includes coupling a nozzle segment to a support within the turbine engine. The nozzle segment includes an inner band, an outer band, and at least one nozzle vane that extends radially between the inner and outer bands. The outer band includes an outer surface and a hook that extends radially outwardly from the outer surface and that extends circumferentially across the outer surface. The hook includes slots defined therein. A first of the slots includes a first circumferential load surface, and a second of the slots includes a second circumferential load surface. Coupling the nozzle segment to the support includes coupling the nozzle segment to the support using the hook, and one of: engaging the first circumferential load surface with an anti-rotation element of the support, wherein the second circumferential load surface does not engage the support; and engaging the second circumferential load surface with an anti-rotation element of the support, wherein the first circumferential load surface does not engage the support.

In another aspect, a kit for replacing a nozzle segment within a first turbine engine and a second turbine engine, wherein the first turbine engine is a different model than the second turbine engine, includes a nozzle segment that includes an inner band, an outer band, and at least one nozzle vane that extends radially between the inner and outer bands. The outer band includes an outer surface and a hook that extends radially outwardly from the outer surface. The hook is oriented to selectively couple to a support within the first turbine engine and to a support within the second turbine engine. The hook extends circumferentially across the outer surface and includes slots defined therein. A first of the slots enables the nozzle segment to be coupled within the first turbine engine, and a second of the slots enables the nozzle segment to be coupled within the second turbine engine.

Figure 1:
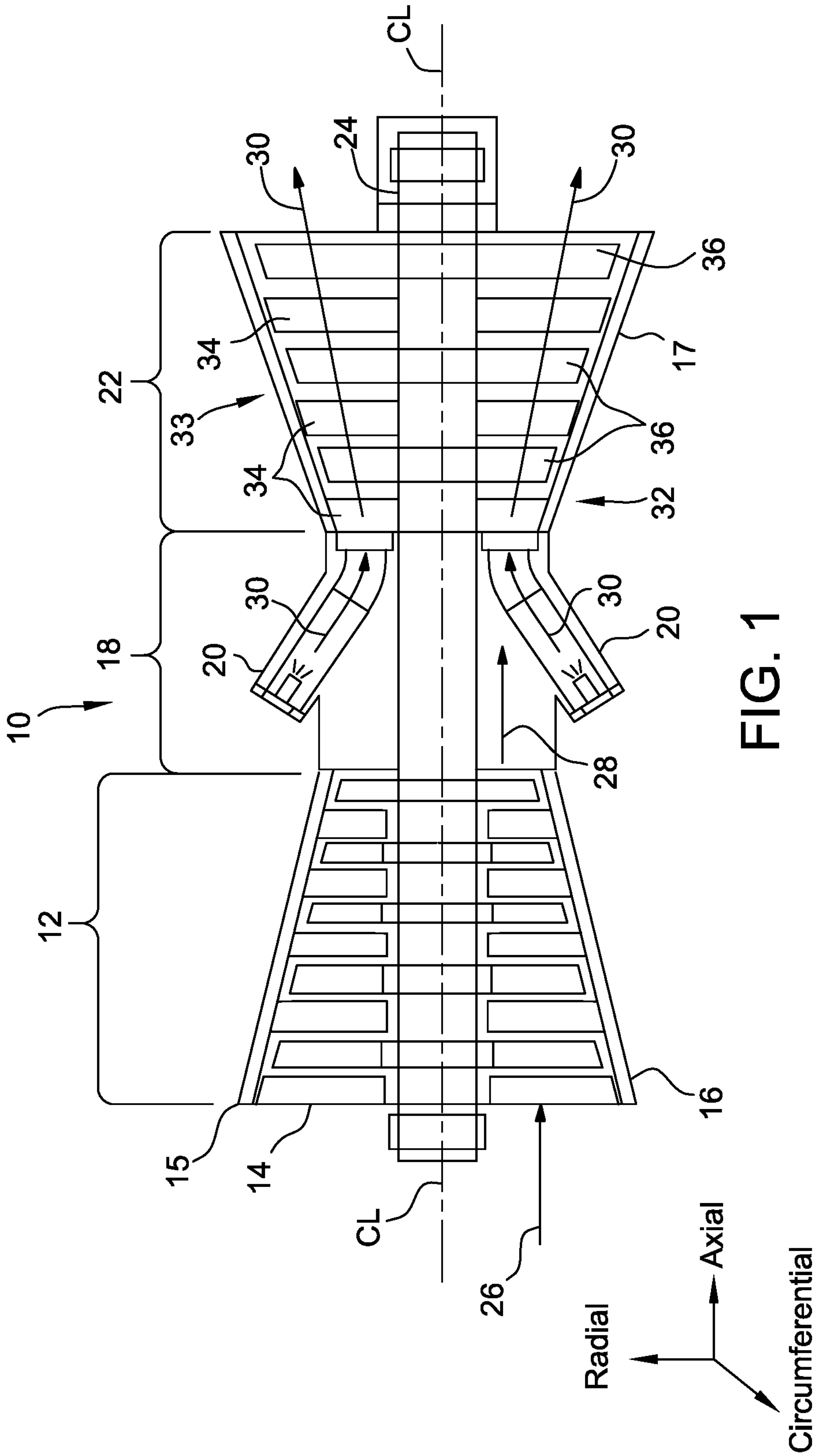
FIG. 1 is a schematic cross-sectional view of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein. Like features between the drawings are indicated using like reference numerals.

DETAILED DESCRIPTION

The exemplary embodiments described herein relate to nozzle segments that may be used in rotary machines (e.g., gas turbine engines). The exemplary nozzle segments include one or more nozzle vanes extending between an inner band and an outer band. The nozzle segments are secured within a rotary machine by coupling the inner band to an inner support that extends circumferentially within a turbine section of the rotary machine and by coupling the outer band to an outer support that extends circumferentially within the turbine section of the rotary machine. The outer band includes one or more hooks that extend radially outwardly from an outer surface. The hooks facilitate coupling the nozzle segment to the outer support, and each hook extends circumferentially across the outer surface of the outer band. At least one of the hooks includes slots defined therein that are adapted to engage anti-rotation elements (e.g., blocks, pins, or lugs) extending from the turbine outer support. Each slot is formed with a circumferential load surface that engages an anti-rotation element to facilitate limiting or preventing circumferential movement of the nozzle segment within the rotary machine during operation.

Different rotary machines (e.g., different gas turbine engines) typically differ in various design configurations. One such difference between rotary machines is the configuration of the outer support and, in particular, the configuration of the anti-rotation elements that extend from the turbine outer support. The hook configuration and the location, size, and shape of the slots defined in the nozzle segment hook are designed to match the outer support configuration in a specific rotary machine. The matching configurations between the turbine outer support and the nozzle segment hooks for a specific rotary machine enable suitable circumferential positioning of the nozzle segments within the turbine section of that specific rotary machine, and also facilitate reducing opportunities for error, misuse, and/or failure that may occur with installation and/or operation of the wrong nozzle segments within the rotary machine.

Typically, known nozzle segments are designed and fabricated for use with a specific rotary machine and cannot be used interchangeably or installed interchangeably between different rotary machines. More specifically, the hook configuration of nozzle segments may be specifically designed to match the outer support configuration of a specific model of rotary machine, and, as such, known nozzle segments are not suitable for coupling within different models of rotary machines. For example, nozzle segments that do not include slots having the appropriate size and/or shape, and/or slots defined at the appropriate locations on the hook that are selected to "match" the anti-rotation element configuration of an outer support of a specific model of rotary machine may be prevented from being coupled within the outer support of a different, i.e., an un-intended, model of rotary machine and thus are prevented from being coupled within the different model rotary machine. The conventional hook configuration is intentionally designed to ensure that only a suitable nozzle segment may be installed within a specific model of rotary machine. This introduces disadvantages including limiting the number of available nozzle segments that can be used to assemble and/or repair a certain rotary machine, as well as requiring the inventory of multiple types of nozzle segments for use in multiple models of rotary machines.

The exemplary embodiments disclosed herein include an exemplary nozzle segment that is suitable for use with multiple, different models of rotary machines. In particular, the exemplary nozzle segment described herein includes a hook extending from the outer surface of the outer band. The hook includes slots defined therein that are sized and oriented to receive anti-rotation elements (e.g., blocks, pins, or lugs) extending from multiple turbine outer supports having different anti-rotation element configurations. Each hook slot includes a circumferential load surface that is oriented such that when the nozzle segment is coupled within a first type, i.e., a first model, of rotary engine (hereinafter referred to as a first turbine engine), at least a first of the circumferential load surfaces engages an anti-rotation element of the outer support within the first turbine engine, and at least a second of the circumferential load surfaces does not engage an anti-rotation element. When the same nozzle segment is coupled within a second, different type (i.e., a second model) of rotary machine (hereinafter referred to as a second turbine engine), the second circumferential load surface engages an anti-rotation element of the outer support of the second turbine engine, and the at least one other, such as the first, circumferential load surface does not engage an anti-rotation element within the second turbine engine. Thus, the exemplary nozzle segment includes slots formed in the hook that enable the exemplary nozzle segment to be coupled within different rotary machine types while maintaining the circumferential positioning of the nozzle segments within the turbine section of each rotary machine, and while still providing "Murphy-proofing" and reducing opportunities for error, misuse, and/or failure associated with installation and operation of the nozzle segments within each respective rotary machine.

The exemplary nozzle segment described herein also provides the additional advantage of enhancing flexibility in the number of rotary machines suitable for use with the nozzle segment, thus enabling a greater number of available nozzle segments for assembly and/or repair of a rotary machine. Moreover, the exemplary nozzle segment may further facilitate reducing downtime and maintenance costs associated with assembly and/or repair of rotary machines, as well as material costs associated with fabricating nozzle segments that may be used in a rotary machine.

Referring now to the drawings, FIG. 1 is a schematic cross-sectional view of an exemplary gas turbine engine 10. The gas turbine engine 10 includes a compressor section 12 including an inlet 14 defined at an upstream end 15 of the gas turbine engine 10 and a casing 16 that at least partially circumscribes the compressor section 12. The gas turbine engine 10 also includes a combustion section 18 including a combustor 20 downstream from the compressor section 12, and a turbine section 22 downstream from the combustion section 18. An outer casing 17 at least partially circumscribes the turbine section 22. A rotor shaft 24 extends axially through the gas turbine engine 10. The combustion section 18 may include a plurality of combustors 20. Directional terms such as "radially," "axially," "circumferentially," "forward," and "aft" used to describe elements and features of the gas turbine engine 10 are used with reference to the orientation shown in FIG. 1 and are used solely for ease of description.

The gas turbine engine 10 and elements and features thereof are not limited to a particular orientation. The gas turbine engine 10 may be referred to herein as a first gas turbine engine 10 or a second gas turbine engine 10. The first gas turbine engine 10 is a different model gas turbine engine than the second gas turbine engine 10, and/or the first and second gas turbine engines 10 are available from different original equipment manufacturers (OEMs). Suitable first and second gas turbine engines 10 include, but are not limited to including, 501F Series gas turbine engines commercially available from General Electric Company, Greenville, SC, and 501F series gas turbine engines commercially available from a different OEM.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 into the turbine section 22 across a first stage 32 of turbine nozzles 34 and turbine blades 36. The hot gas 30 rapidly expands as it flows through alternating stages (e.g., the first stage 32 and a second stage 33 downstream from the first stage 32) of turbine blades 36 and turbine nozzles 34 coupled within the turbine section 22 along an axial centerline CL of the shaft 24. Thermal and/or kinetic energy is transferred from the hot gas to each stage of the turbine blades 36, thereby causing the shaft 24 to rotate and produce mechanical work. The shaft 24 may be coupled to a load such as a generator (not shown) to produce electricity. In addition, or in the alternative, the shaft 24 may be used to drive the compressor section 12 of the gas turbine engine 10.

Figure 2:
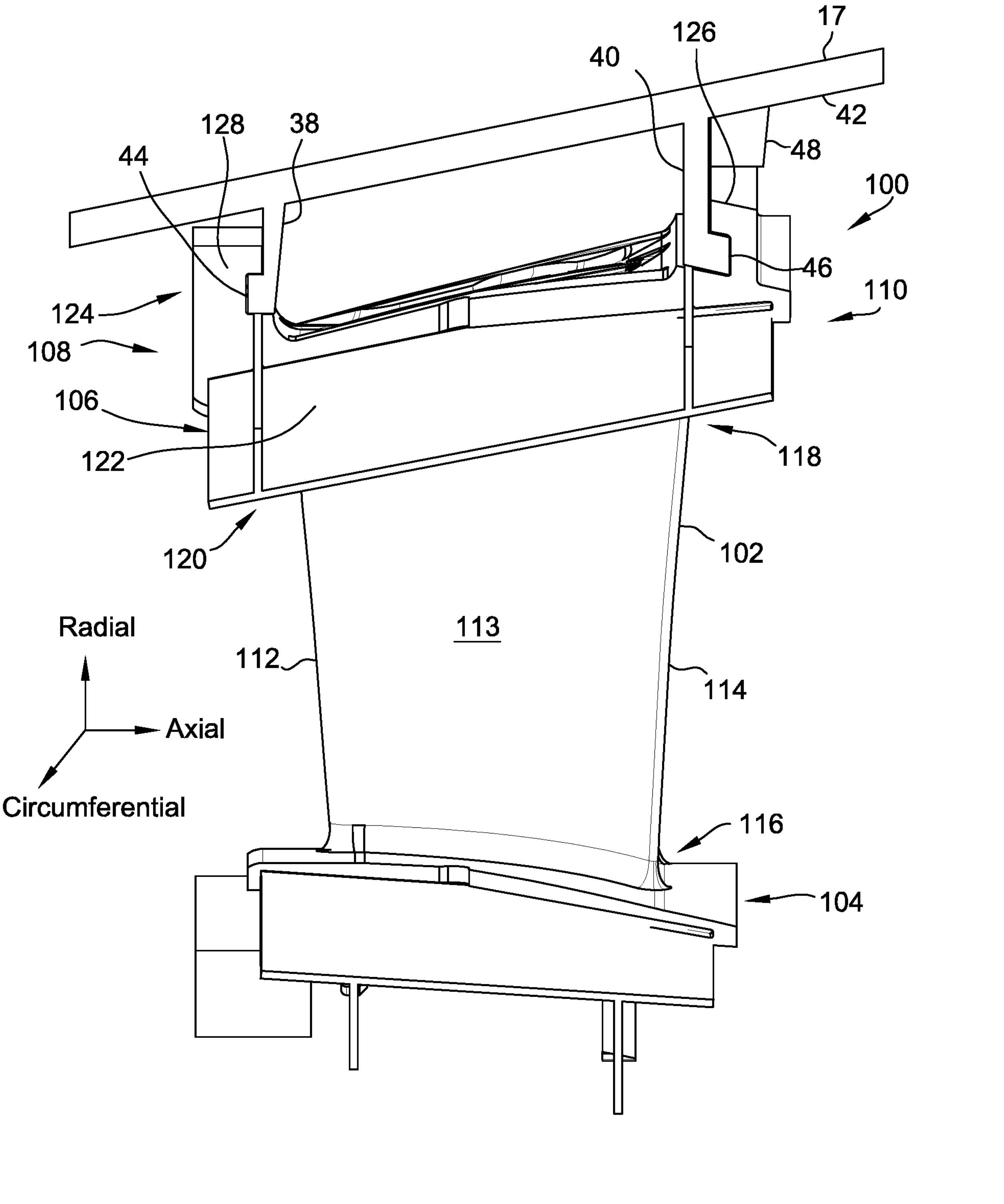
FIG. 2 is a side elevational view of an exemplary nozzle segment that may be coupled to an outer support within the gas turbine engine shown in FIG. 1.

FIG. 2 is a side elevational view of an exemplary nozzle segment 100 coupled within the gas turbine engine 10 (shown in FIG. 1). In the exemplary embodiment, the nozzle segment 100 is coupled to the outer casing 17. The outer casing 17 at least partially circumscribes the turbine section 22 (shown in FIG. 1). The outer casing 17, which is shown schematically in FIGS. 1 and 2, may include a turbine shell and an outer turbine component, such as a shroud for example, coupled to the turbine shell. The nozzle segment 100 may be coupled to the turbine shell and/or the shroud of the outer casing 17. Alternatively, the outer casing 17 may include a turbine shell without the outer turbine component, and the nozzle segment 100 may be coupled directly to the turbine shell of the outer casing 17. The outer casing 17 may also be referred to herein as an outer support 17 or a support 17.

As shown in FIG. 2, the outer casing 17 includes circumferentially extending railings 38 and 40 spaced an axial distance from one another. The railings 38 and 40 each extend radially downwardly from an interior surface 42 of the outer casing 17. More specifically, each railing 38 and 40 extends radially downwardly to an outwardly extending ledge 44 and 46, respectively. The railings 38 and 40 may each be coupled to the outer casing 17, or one or both of the railings 38 and 40 may be formed integrally with the outer casing 17. The railings 38 and 40 may each include multiple railings 38 and 40 coupled to the outer casing 17, the railings 38 being circumferentially spaced from one another and the railings 40 being circumferentially spaced from one another. In the exemplary embodiment, the railings 38 and 40 are in the form of isolation rings that are coupled to the outer casing 17 and positioned circumferentially across the outer casing 17. The number of railings 38 and 40 may suitably complement the number of nozzle segments 100 coupled to the outer casing 17 to form a stage of turbine nozzles 34. In other embodiments, the railings 38 and/or 40 may be a unitary component coupled to or formed integrally with the outer casing 17 that extends substantially entirely across the outer casing 17 in the circumferential direction. The outwardly extending ledges 44 and 46 of the railings 38 and 40, respectively, enable the nozzle segment 100 to be coupled to the outer casing 17.

The outer casing 17 also includes radially downwardly extending anti-rotation elements 48 (e.g., blocks, pins, or lugs). The anti-rotation elements 48 may be coupled to the outer casing 17 or formed integrally with the outer casing 17. The anti-rotation elements 48 are circumferentially spaced from one another. In the exemplary embodiment, each anti-rotation element 48 is located adjacent to one of the railings 40. Anti-rotation elements 48 may additionally and/or alternatively be located adjacent to one of the railings 38. The size, shape, and circumferential spacing and location of the anti-rotation elements 48 determine a suitable configuration of the nozzle segment 100 coupled to the outer casing 17, described in more detail below. The anti-rotation elements 48 facilitate maintaining the circumferential positioning of the nozzle segment 100 within the turbine section 22, and reducing opportunities for error, misuse, and/or failure associated with installation and operation of the nozzle segment 100 within the gas turbine engine 10.

The exemplary nozzle segment 100 includes at least one vane 102 extending radially between an inner band 104 and an outer band 106. The nozzle segment 100 may be implemented as one of an array of nozzle segments 100 that form a stage of turbine nozzles 34 within the turbine section 22 of the gas turbine engine 10 (shown in FIG. 1). In the exemplary embodiment, the nozzle segment 100 is included in the second stage 33 of turbine nozzles 34 that is downstream from the first stage 32 of turbine nozzles 34 and associated turbine blades 36. Additionally, and/or alternatively, the nozzle segment 100 may be included in the first stage 32 of turbine nozzles 34 that is directly downstream from the combustion section 18, and/or in a later stage of turbine nozzles 34 (e.g., a third stage of turbine nozzles 34). The nozzle segment 100 forms one arcuate segment 100 of a plurality of such nozzle segments 100 coupled to the outer casing 17 in an annular array, such that the vanes 102 of the nozzle segments 100 circumscribe the shaft 24 (shown in FIG. 1), with rows of turbine blades 36 on the rotor located on opposite sides of the stationary nozzle 34 in a known fashion. The nozzle segments 100 are also coupled, via the inner band 104, to an inner support ring (not shown) that extends circumferentially within the turbine section 22 about the shaft 24. Directional terms such as "radially," "axially," "circumferentially," "forward," and "aft" used to describe elements and features of the nozzle segment 100 are used with reference to the orientation shown in FIGS. 1 and 2, when the nozzle segment 100 is coupled within the gas turbine engine 10. These terms are used solely for ease of description. The nozzle segment 100 and elements and features thereof are not limited to a particular orientation.

Figure 3:
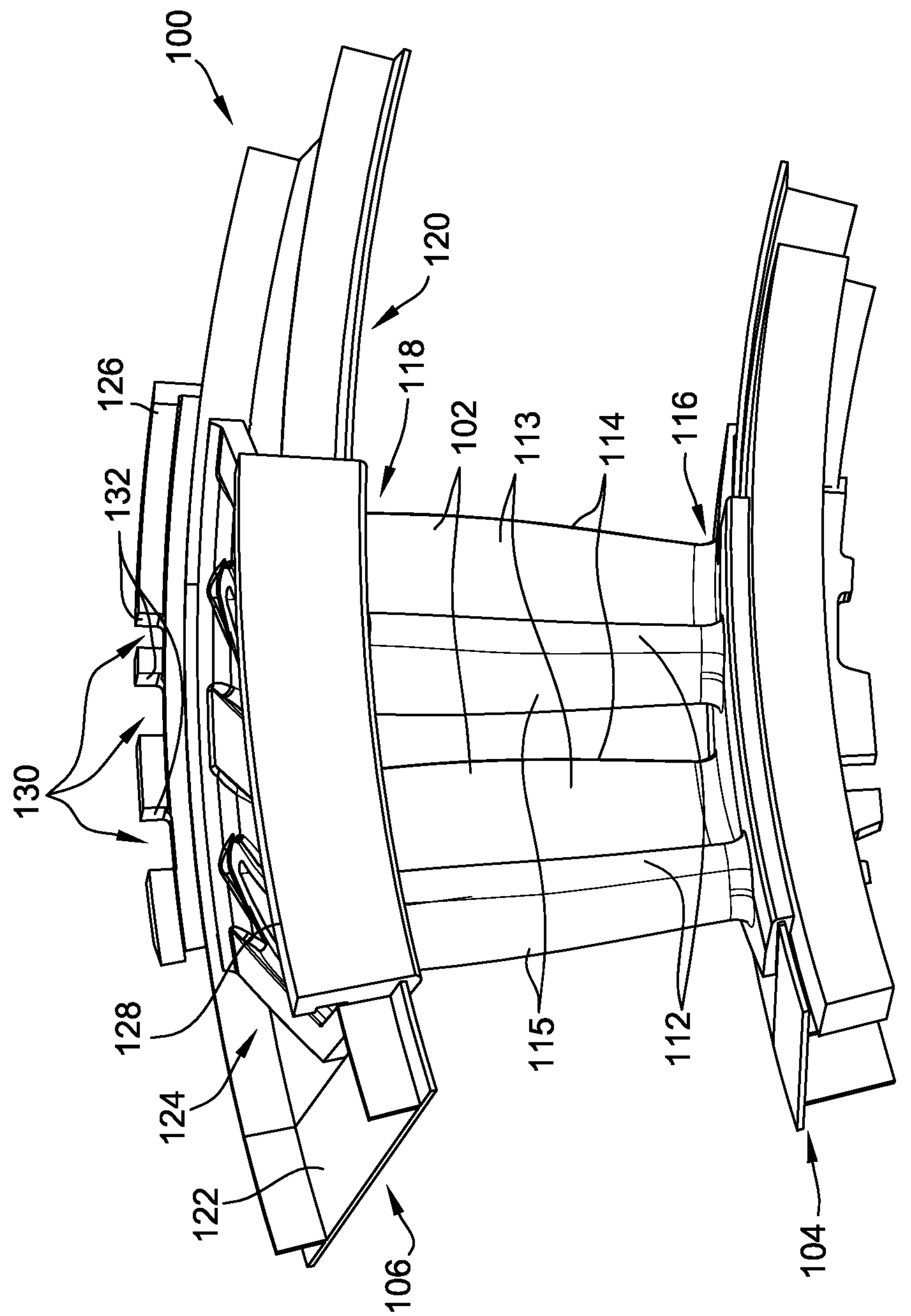
FIG. 3 is a front perspective view of the nozzle segment shown in FIG. 1.

With additional reference to FIG. 3, in the exemplary embodiment, the nozzle segment 100 includes a pair of (i.e., two) circumferentially adjacent vanes 102 extending between the inner band 104 and the outer band 106 and may also be referred to as a doublet nozzle segment 100. In other embodiments, for example, the nozzle segment 100 may be a singlet nozzle segment 100 (i.e., including a single (i.e., one) vane 102 extending between the inner band 104 and the outer band 106), or the nozzle segment 100 may be a triplet nozzle segment 100 (i.e., including three adjacent vanes 102 extending between the inner band 104 and the outer band 106). In embodiments where the nozzle segment 100 is a doublet nozzle segment 100, the vanes 102, the inner band 104, and the outer band 106 made be formed integrally such that the nozzle segment 100 defines a four-bar linkage between the vanes 102, the inner band 104, and the outer band 106. Similarly, for a triplet nozzle segment 100, the vanes 102, the inner band 104, and the outer band 106 made be formed integrally such that the nozzle segment 100 defines a five-bar linkage. For example, the vanes 102, the inner band 104, and the outer band 106 made be fabricated via molding, casting, additive manufacturing, or any other suitable manufacturing process.

In some embodiments, the vanes 102 may not be integral with the inner band 104 and/or the outer band 106. For example, the linkage between the vanes 102 and the inner band 104 and/or the outer band 106 may be split. The linkage split may be achieved by decoupling previously integral vanes 102 and the inner band 104 and/or outer band 106 (e.g., via electro-discharge machining, electrode cutting, numerical control machining, or another suitable technique). Alternatively, circumferential ends of the inner band 104 and outer band 106 of circumferentially adjacent nozzle segments 100 may be shrouded or ganged together to form a doublet or triplet nozzle segment 100, with the interface between adjacent circumferential ends of the inner bands 104 and outer bands 106 defining a split in the doublet or triplet nozzle segment 100.

As shown in FIG. 2, the nozzle segment 100 has a forward or leading end 108 that faces the combustion section 18 and an opposite aft or trailing end 110. As described above, in the exemplary embodiment, the nozzle segment 100 is included in the second stage 33 of turbine nozzles 34, such that the leading end 108 faces the first stage 32 of turbine blades 36 upstream therefrom when the gas turbine engine 10 is assembled. The vanes 102 of the nozzle segment 100 each have a leading edge 112 that extends radially between the inner and outer bands 104 and 106 adjacent to the leading end 108, and an opposite trailing edge 114 that extends radially between the inner and outer bands 104 and 106 adjacent to the trailing end 110. The vanes 102 also include opposing sidewalls 113 and 115 extending between the leading edge 112 and the trailing edge 114. The sidewall 113 is generally concave in contour, and the sidewall 115 is generally convex in contour. The concave sidewall 113 and opposing convex sidewall 115 together define a generally arcuate contour of the vanes 102 between the leading edge 112 and the trailing edge 114. The vanes 102 also include a radially inner end 116 and a radially outer end 118. The inner band 104 extends from the radially inner end 116 of the vanes 102, and the outer band 106 extends from the radially outer end 118 of the vanes 102. As shown in FIG. 3, the inner band 104 and the outer band 106 are substantially arcuate in shape and extend circumferentially to define the arcuate shape of the nozzle segment 100.

Referring to FIGS. 2 and 3, the outer band 106 includes an inner surface 120 that extends from the radially outer end 118 of the vanes 102, and an outer surface 122 opposite the inner surface 120. The outer band 106 also includes a hook system 124 that extends radially outwardly from the outer surface 122 and that extends circumferentially across the outer surface 122. The hook system 124 enables the nozzle segment 100 to be coupled to the outer casing 17 within the turbine section 22. More specifically, in the exemplary embodiment, the hook system 124 includes a first hook 126 and a second hook 128. Each of the first hook 126 and the second hook 128 extends radially outwardly from the outer surface 122 and circumferentially across the outer surface 122. The first hook 126 is oriented to engage the ledge 46 of the railing 40, and the second hook 128 is oriented to engage the ledge 44 of the railing 38. The engagement of the first hook 126 and the ledge 46 may maintain the nozzle segment 100 fixed relative to the outer casing 17 in one axial direction, and the engagement of the second hook 128 and the ledge 44 may maintain the nozzle segment 100 fixed relative to the outer casing 17 in another axial direction.

In the exemplary embodiment, as shown in FIG. 2, the first hook 126 extends in a forward direction (i.e., towards the combustion section 18) and engages the ledge 46 to limit axial movement of the nozzle segment 100 in the forward direction, and the second hook 128 extends in the aft direction (i.e., opposite the forward direction) and engages the ledge 46 to limit axial movement of the nozzle segment 100 in the aft direction. The engagement between the first hook 126 and the ledge 46 and/or the engagement between the second hook 128 and the ledge 44 may permit slight axial movement of the nozzle segment 100 with respect to the outer casing 17 to accommodate expansion and contraction during thermal cycling experienced during operation of the gas turbine engine 10.

The first hook 126 and the second hook 128 are spaced an axial distance from one another. In the exemplary embodiment, the first hook 126 is located adjacent to the trailing end 110 of the nozzle segment 100, and the second hook 128 is located adjacent to the leading end 108 of the nozzle segment 100. The location and/or orientation of the first hook 126 and the second hook 128 may vary depending on a configuration of the outer casing 17 or, more specifically, on a configuration and axial spacing of the railings 38 and 40. Suitably, the first hook 126 and the second hook 128 enable the nozzle segment 100 to be coupled within different models of gas turbine engines 10. More specifically, the first hook 126 and the second hook 128 are configured to engage the railings 38 and 40 extending from outer casings 17 to couple the nozzle segment 100 within the turbine section 22 of different types of gas turbine engines 10. For example, in one embodiment, the nozzle segment 100 may be installed within at least a first model and a second model of gas turbine engines 10 manufactured by General Electric Company. In another embodiment, nozzle segment 100 may be installed within at least a first model of a gas turbine engine 10 (e.g., a 501F series gas turbine engine) commercially available from General Electric Company, and in a second model of a gas turbine engine 10 (e.g., a 501F series gas turbine engine) commercially available from a different turbine engine OEM.

Still referring to FIGS. 2 and 3, in the exemplary embodiment, the first hook 126 includes slots 130 defined therein. The slots 130 are formed in the first hook 126 by removing a portion of the first hook 126 via a suitable machining technique (e.g., via electro-discharge machining, electrode cutting, numerical control machining, or another suitable technique). The slots 130 are sized, shaped, and positioned circumferentially along the first hook 126 to align with, and receive, an anti-rotation element 48 of the outer casing 17 (shown in FIG. 2) when the nozzle segment 100 is coupled to the outer casing 17. As described above, the outer casing 17 includes the anti-rotation elements 48 that are circumferentially spaced from one another and located adjacent to the railing 40, and a size, shape, and circumferential spacing and location of the anti-rotation elements 48 determines a suitable configuration of the nozzle segment 100 to be coupled to the outer casing 17. The slots 130 are defined in the first hook 126 to substantially match a location of, and thus to engage, the anti-rotation elements 48 extending from the outer casing 17. Without the slots 130 defined in the first hook 126, the nozzle segment 100 is not couplable with the outer casing 17. Thus, the anti-rotation elements 48 and slots 130 facilitate reducing opportunities for error, misuse, and/or failure associated with installation and operation of the nozzle segments 100 within the gas turbine engine 10, for example, by improper coupling of the nozzle segment 100 to the outer casing 17 or use of a nozzle segment 100 not suitable for the gas turbine engine 10. In some embodiments, slots 130 may additionally and/or alternatively be formed in the second hook 128. For example, in some embodiments, slots 130 may be suitably formed in the second hook 128 for receiving anti-rotation elements 48 that may be located adjacent to the railings 38.

The slots 130 and the anti-rotation elements 48 also facilitate preventing circumferential movement of the nozzle segment 100 during operation of the gas turbine engine 10. In particular, each slot 130 is formed with a circumferential load surface 132 that engages the anti-rotation element 48 received within the slot 130. The engagement between the anti-rotation element 48 and the circumferential load surface 132 limits or prevents the circumferential movement of the nozzle segment 100 that may otherwise be caused by hot gas flowing across the vanes 102 and, in particular, across the concave sidewall 113 of the vanes 102 during operation of the gas turbine engine 10. In the exemplary embodiment, the slots 130 are defined in the first hook 126 such that the slots 130 have substantially the same depth $H_1$, $H_2$, and $H_3$ (shown in FIG. 5). A radial height of each circumferential load surface 132 corresponds to the depth $H_1$, $H_2$, and $H_3$ of the respective slot 130. As such, the circumferential load surfaces 132 are each formed with substantially the same radial height. In other embodiments, the slots 130 may have varying depths $H_1$, $H_2$, and $H_3$, depending on the size and/or shape of the anti-rotation elements 48 of the outer casing 17.

Additionally, in the exemplary embodiment, the slots 130 enable the nozzle segment 100 to be couplable to outer casings 17 having different configurations of anti-rotation elements 48. The slots 130 are defined in the first hook 126 at suitable circumferential locations such that at least one of the slots 130 receives an anti-rotation element 48 of a first outer casing 17 and at least one other of the slots 130 receives an anti-rotation element 48 of a second outer casing 17 having a different anti-rotation element configuration from the first outer casing 17. The first outer casing 17 may be used in a first type of gas turbine engine 10, and the second outer casing 17 may be used in a second, different type of gas turbine engine 10. As a result, the nozzle segment 100 is couplable within the different first and second types of gas turbine engines 10.

Figure 4:
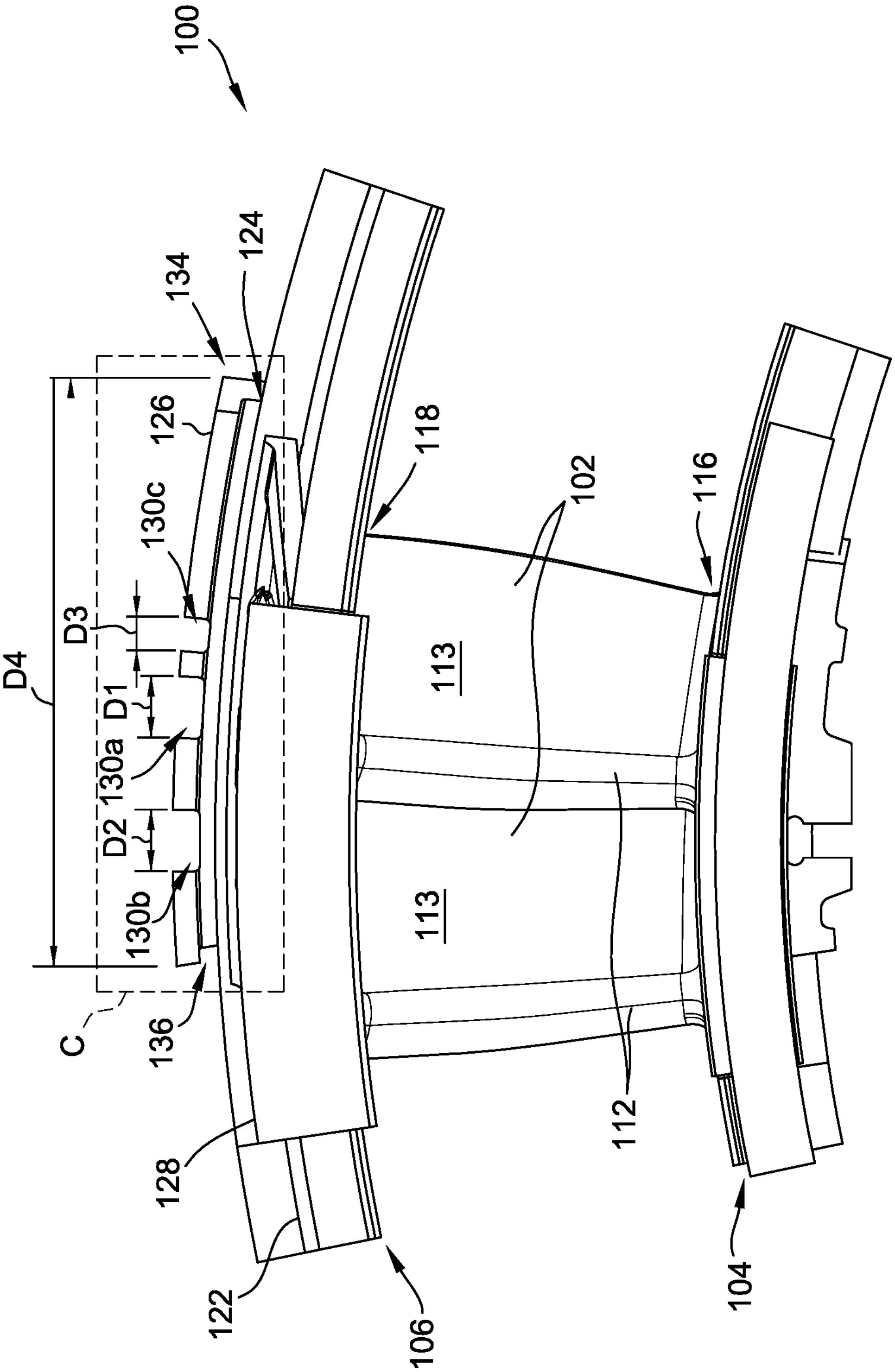
FIG. 4 is a front elevational view of the nozzle segment shown in FIGS. 2 and 3
Figure 5:
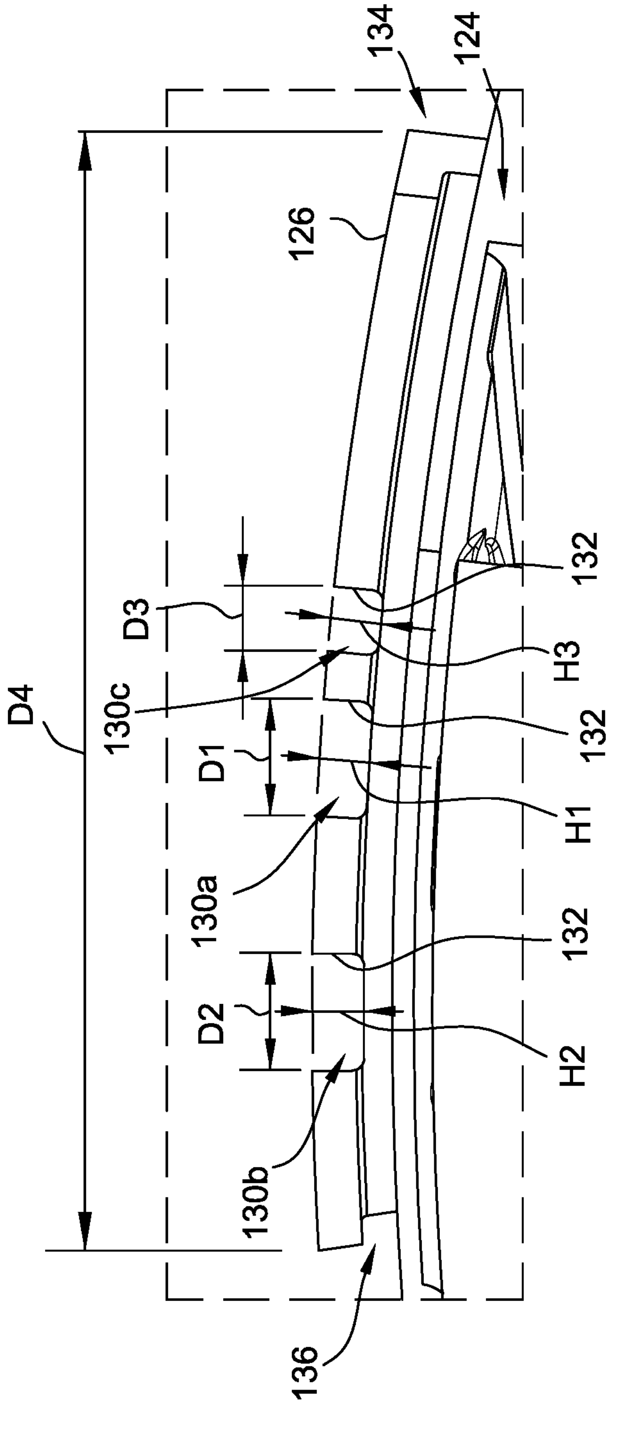
FIG. 5 is an enlarged view of a portion of the nozzle segment shown in FIGS. 2-4 indicated by the section call-out C shown in FIG. 4.

With additional reference to FIGS. 4 and 5, in the exemplary embodiment, the slots 130 include a first slot 130*a*, a second slot 130*b*, and a third slot 130*c*. In alternative embodiments, the size, relative location, and orientation of slots 130 may be different. Moreover, in other embodiments, nozzle segment 100 may be formed with more than three slots 130 or fewer than three slots 130. Each of the first slot 130*a*, the second slot 130*b*, and the third slot 130*c* includes a circumferential load surface 132 and is sized, shaped, and oriented to receive an anti-rotation element 48 of an outer casing 17. In the exemplary embodiment, the first slot 130*a* is sized, shaped, and oriented to receive an anti-rotation element 48 of a first outer casing 17 having a first anti-rotation element configuration. The second slot 130*b* and the third slot 130*c* are sized, shaped, and oriented to receive an anti-rotation element 48 of a second outer casing 17 having a second anti-rotation element configuration that is different from the first anti-rotation element configuration. The first outer casing 17 may be included in a first model of a gas turbine engine 10, and the second outer casing 17 may be included in a second model of a gas turbine engine 10.

When the nozzle segment 100 is coupled to the first outer casing 17, the anti-rotation element 48 received by the first slot 130*a* engages the circumferential load surface 132 of the first slot 130*a*. Because the second slot 130*b* and the third slot 130*c* do not receive an anti-rotation element 48 of the first outer casing 17, the circumferential load surfaces 132 of the second slot 130*b* and the third slot 130*c* do not engage an anti-rotation element when the nozzle segment 100 is coupled to the first outer casing 17. When the nozzle segment 100 is coupled to the second outer casing 17, the anti-rotation elements 48 respectively received by the second slot 130*b* and the third slot 130*c* respectively engage the circumferential load surfaces 132 of the second slot 130*b* and the third slot 130*c*. Moreover, when the nozzle segment 100 is coupled to the second outer casing 17, one or both of the second slot 130*b* and the third slot 130*c* may receive an anti-rotation element 48. For example, in some embodiments, the second anti-rotation element configuration of the second outer casing 17 may be such that two anti-rotation elements 48 are positioned for being received by each of the second and third slots 130*b* and 130*c* of the nozzle segment 100. Alternatively, in some embodiments, the second anti-rotation element configuration of the second outer casing 17 may be such that one anti-rotation element 48 is positioned for being received by one of the second and third slots 130*b* and 130*c* of the nozzle segment 100. In embodiments where the second anti-rotation element configuration includes one anti-rotation element 48 for each nozzle segment 100, the position of the anti-rotation elements 48 may alternate such that some of the nozzle segments 100 coupled to the second outer casing 17 receive an anti-rotation element 48 via the second slot 130*b* and others of the nozzle segments 100 coupled to the second outer casing 17 receive an anti-rotation element 48 via the third slot 130*c*. Because the first slot 130*a* does not receive an anti-rotation element 48 of the second outer casing 17, the circumferential load surface 132 of the first slot 130*a* does not engage an anti-rotation element when the nozzle segment 100 is coupled to the second outer casing 17.

As described above, the size, shape, and orientation of the first slot 130*a*, the second slot 130*b*, and the third slot 130*c* substantially matches anti-rotation element configurations of different types of outer casings 17 to enable the nozzle segment 100 to be couplable within different types of gas turbine engines 10. In the exemplary embodiment, the first slot 130*a* that receives an anti-rotation element 48 of the first outer casing 17 is defined in the first hook 126 in proximity to a medial portion of the first hook 126. The second and third slots 130*b* and 130*c* are defined in the first hook 126 on opposing sides of the first slot 130*a*. As shown in FIG. 5, each of the slots 130$a$-130$c$ has a depth $H_1$, $H_2$, and $H_3$, respectively. The depth $H_1$ corresponds to a radial height of the circumferential load surface 132 of the first slot 130$a$. The depth $H_2$ corresponds to a radial height of the circumferential load surface 132 of the second slot 130$b$. The depth $H_3$ corresponds to a radial height of the circumferential load surface 132 of the third slot 130$b$. In the exemplary embodiment, the depths $H_1$, $H_2$, and $H_3$ of the slots 130$a$-130$c$ are substantially the same such that the circumferential load surfaces 132 of the slots 130$a$-130$c$ each have substantially the same radial height. In other embodiments, the slots 130$a$-130$c$ may have varying depths and/or positions, depending on the size and/or shape of the anti-rotation elements 48 of the different types of outer casings 17 to which the nozzle segment 100 is suitably couplable.

Referring to FIGS. 4 and 5, the slots 130$a$-130$c$ each span a suitable circumferential distance for receiving a respective anti-rotation element 48 of one of the outer casings 17 to which the nozzle segment 100 is suitably couplable. In the exemplary embodiment, the first slot 130$a$ and the second slot 130$b$ each span a greater circumferential distance $D_1$ and $D_2$, respectively, than a circumferential distance $D_3$ spanned by the third slot 130$c$. The circumferential distances $D_1$ and $D_2$ of the first slot 130$a$ and the second slot 130$b$, respectively, are approximately equal in the exemplary embodiment. In other embodiments, the slots 130$a$-130$c$ may respectively span any suitable circumferential distance $D_1$, $D_2$, and $D_3$ to enable the nozzle segment 100 to be couplable to different types of outer casings 17. For example, the circumferential distances $D_1$, $D_2$, and $D_3$ may vary depending on the size and/or shape of the anti-rotation elements 48 of the different types of outer casings 17 to which the nozzle segment 100 is suitably couplable.

In the exemplary embodiment, a sum of the circumferential distances $D_1$, $D_2$, and $D_3$ spanned by the slots 130$a$-130$c$ is suitably a relatively low percentage of the total circumferential distance spanned by the first hook 126. Thereby, the amount of material removed from the first hook 126 is minimal so as to maintain sufficient engagement between the first hook 126 and the ledge 46 to enable the first hook 126 to function as described herein. As shown in FIG. 4, the first hook 126 extends circumferentially across the outer surface 122 and spans a circumferential distance $D_4$ between a first circumferential end 134 and a second circumferential end 136. Suitably, the sum of the distances $D_1$, $D_2$, and $D_3$ spanned by the slots 130$a$-130$c$ is less than about 35% of the circumferential distance $D_4$ spanned by the first hook 126, such as less than about 30% of the circumferential distance $D_4$, less than about 25% of the circumferential distance $D_4$, less than about 20% of the circumferential distance $D_4$, less than about 15% of the circumferential distance $D_4$, less than about 10% of the circumferential distance $D_4$ spanned by the first hook 126, or less than about 5% of the circumferential distance $D_4$ spanned by the first hook 126. For example, the sum of the distances $D_1$, $D_2$, and $D_3$ spanned by the slots 130$a$-130$c$ may be between about 1% to about 40% of the circumferential distance $D_4$ spanned by the first hook 126, such as between about 1% to about 30%, between about 1% to about 25%, between about 1% to about 20%, between about 1% to about 15%, or between about 1% to about 10% of the circumferential distance $D_4$ spanned by the first hook 126.

Figure 6:
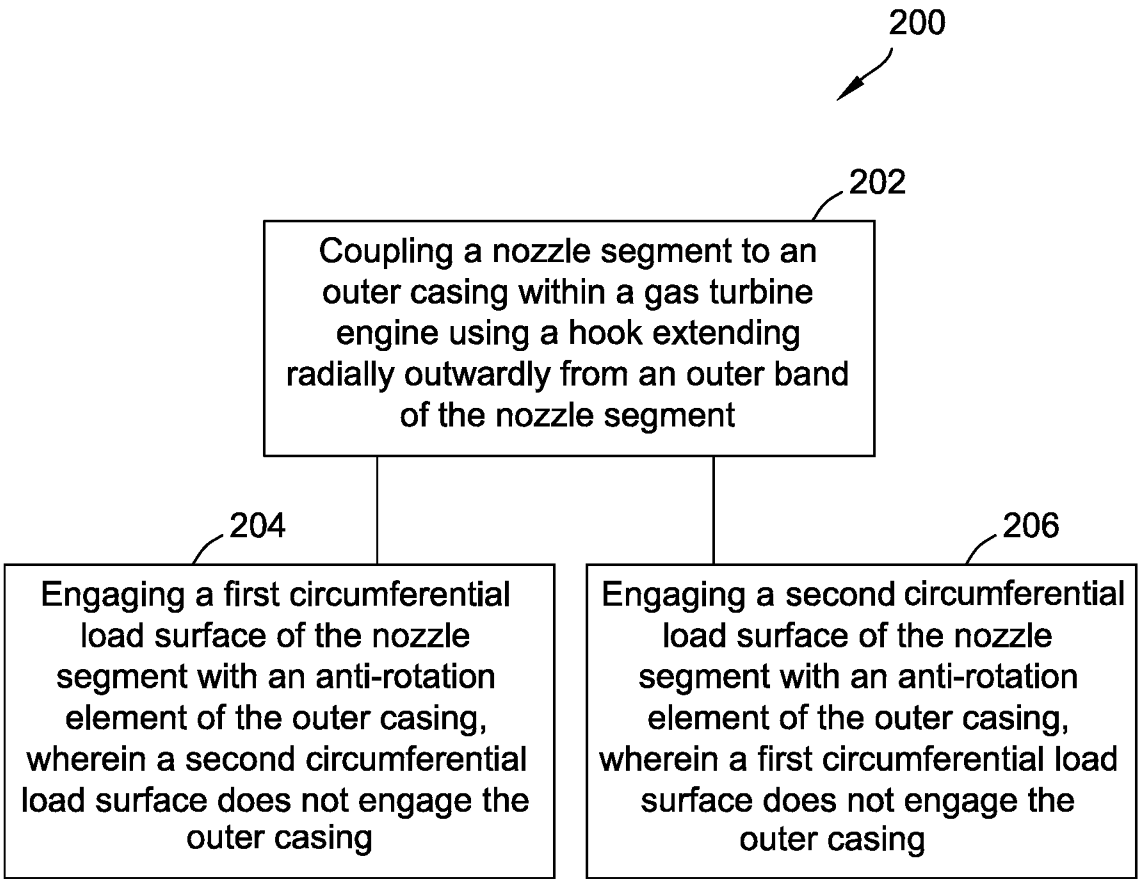
FIG. 6 is a flowchart of an exemplary method of assembling a turbine engine.

FIG. 6 is a flowchart of an exemplary method 200 of assembling a gas turbine engine 10 (shown in FIG. 1). With reference also to FIGS. 1-5, the gas turbine engine 10 includes an outer casing or support 17 that extends circumferentially within a turbine section 22. The outer casing 17 includes railings 38 and 40 that each extend radially downwardly from an interior surface 42 of the outer casing 17. Each railing 38 and 40 extends radially downwardly to an outwardly extending ledge 44 and 46, respectively. The outer casing 17 also includes radially downwardly extending anti-rotation elements 48 (e.g., blocks, pins, or lugs) that are circumferentially-spaced from one another and located adjacent to the railings 40. The method includes coupling 202 an exemplary nozzle segment 100 to the outer casing 17. The nozzle segment 100 includes at least one nozzle vane 102 that extends radially between an inner band 104 and an outer band 106. The outer band 106 includes an outer surface 122 and a hook system 124 that extends radially outwardly from the outer surface 122. The hook system 124 includes a first hook 126 extending radially outwardly from and circumferentially across the outer surface 122. The first hook 126 includes slots 130 defined therein. The slots 130 include at least a first slot 130$a$ and a second slot 130$b$. Each of the first slot 130$a$ and the second slot 130$b$ is formed with a circumferential load surface 132.

In the exemplary method 200, the nozzle segment 100 is coupled 202 to the outer casing 17 using the first hook 126 that engages the ledge 46 of the railing 40. The first hook 126 is suitably oriented to engage the ledge 46. In the exemplary embodiment, the first hook 126 is oriented to face a forward direction (i.e., towards a combustion section 18 of the gas turbine engine) when the nozzle segment 100 is coupled 202 to the outer casing 17. The hook system 124 of the nozzle segment 100 may also include a second hook 128 extending radially outwardly from and circumferentially across the outer surface 122. The nozzle segment 100 may also be coupled 202 to the outer casing 17 using the second hook 128 that engages the ledge 44 of the railing 38. The second hook 126 may be oriented to engage the ledge 44. For example, the second hook 128 may be oriented to face an aft direction (i.e., opposite the forward direction) when the nozzle segment 100 is coupled 202 to the outer casing 17.

The exemplary method 200 also includes engaging 204 or 206 a circumferential load surface 132 of one of the first slot 130$a$ and the second slot 130$b$ with an anti-rotation element 48 of the outer casing 17. As described above, the slots 130 defined in the first hook 126 are configured to enable coupling 202 the nozzle segment 100 to different models of gas turbine engines 10 having outer casings 17 with different anti-rotation element configurations. In the exemplary method 200, when the nozzle segment 100 is coupled 202 to a first outer casing 17 having a first anti-rotation element configuration, the method 200 includes receiving an anti-rotation element 48 of the first outer casing 17 within the first slot 130$a$ when the nozzle segment 100 is coupled to the outer casing 17, such that the anti-rotation element 48 engages 204 the circumferential load surface 132 of the first slot 130$a$. When the nozzle segment 100 is coupled 202 to the first type of outer casing 17, such that an anti-rotation element 48 engages 204 the circumferential load surface 132 of the first slot 130$a$, the second slot 130$b$ does not engage the first outer casing 17. The second slot 130$b$ is sized, shaped, and oriented for receiving an anti-rotation element 48 of a second, different outer casing 17. The second outer casing 17 has a second anti-rotation element configuration that is different from the first anti-rotation element configuration of the first outer casing 17.

In the exemplary method 200, when the nozzle segment 100 is coupled to the second outer casing 17 having the second anti-rotation element configuration, the method 200 includes receiving an anti-rotation element 48 of the outer casing 17 within the second slot 130*b*, such that the anti-rotation element 48 engages 206 the circumferential load surface 132 of the second slot 130*b*. When the nozzle segment 100 is coupled 202 to the second type of outer casing 17, such that an anti-rotation element 48 engages 206 the circumferential load surface 132 of the second slot 130*b*, the first slot 130*a* does not engage the second outer casing 17.

In some embodiments, the first hook 126 may also include a third slot 130*c* that includes a circumferential load surface 132. The third slot 130*c* is sized, shaped, and oriented to receive an anti-rotation element 48 of the second outer casing 17. As such, in these embodiments, when the nozzle segment 100 is coupled 202 to the first outer casing 17, such that an anti-rotation element 48 engages 204 the circumferential load surface 132 of the first slot 130*a*, the second slot 130*b* and the third slot 130*c* do not engage the first outer casing 17. Similarly, in these embodiments, when the nozzle segment 100 is coupled 202 to the second outer casing 17, an anti-rotation element 48 engages 206 the circumferential load surface 132 of the second slot 130*b* and/or an anti-rotation element 48 engages 206 the circumferential load surface 132 of the third slot 130*c*, and the first slot 130*a* does not engage the second outer casing 17.

The embodiments described herein relate to nozzle segments for use in rotary machines (e.g., gas turbine engines). The exemplary nozzle segments are suitable for use with multiple, different models of rotary machines. In particular, the exemplary nozzle segments include a hook for coupling the nozzle segment to a support within a turbine section of a first model of rotary machine, and the hook enables the exemplary nozzle segment to be couplable to different types of supports that vary in configuration between different types of rotary machines. The hook of the exemplary nozzle segment includes slots defined therein that are adapted to receive anti-rotation elements (e.g., blocks, pins, or lugs) extending from outer supports having different anti-rotation element configurations. The anti-rotation element configuration must match the slotted hook configuration to enable coupling of the nozzle segment to the support. Thus, the exemplary nozzle segment, including slots formed in the hook that match different anti-rotation element configurations, enables the same nozzle segment to be coupled within different models of rotary machines. The slotted hooks of the exemplary nozzle segments maintain the circumferential positioning of the nozzle segments within the turbine section of each rotary machine and reduce opportunities for error, misuse, and/or failure associated with installation and operation of the nozzle segments within each rotary machine. The exemplary nozzle segment also provides the additional advantage of facilitating greater flexibility in the number of rotary machines suitable for use with the nozzle segment, which enables a greater number of available nozzle segments for assembly and/or repair of a rotary machine. The exemplary nozzle segment may further facilitate reducing downtime and maintenance costs associated with assembly and/or repair of rotary machines, as well as material costs associated with fabricating nozzle segments that may be used in a rotary machine.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The singular forms "a," "an," and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine engine comprising:

a support including an anti-rotation element; and a nozzle segment coupled to the support, the nozzle segment comprising:

an inner band;

an outer band comprising an inner surface and an outer surface opposite the inner surface;

a hook extending radially outwardly from the outer surface and extending circumferentially across the outer surface; and at least one nozzle vane extending radially between the inner and outer bands;

wherein the hook is coupled to the support, the hook comprising slots defined therein, a first of the slots comprising a first circumferential load surface, and a second of the slots comprising a second circumferential load surface;

wherein the slots are positioned such that either the first circumferential load surface engages the anti-rotation element of the support while the second circumferential load surface does not engage any other anti-rotation element of the support, or the second circumferential load surface engages the anti-rotation element of the support while the first circumferential load surface does not engage any other anti-rotation element of the support.

2. The turbine engine according to claim 1, wherein the nozzle segment comprises at least two nozzle vanes extending between the inner band and the outer band.

3. The turbine engine according to claim 2, wherein the at least two nozzle vanes are formed integrally with the outer band and the inner band.

4. The turbine engine according to claim 1, wherein the hook is oriented to face a forward direction of the turbine engine.

5. The turbine engine according to claim 1, wherein the hook is a first hook, and the nozzle segment comprises a second hook coupled to the support and extending radially outwardly from and circumferentially across the outer surface.

6. The turbine engine according to claim 5, wherein the first hook is oriented to face a forward direction of the turbine engine, and the second hook is oriented to face an aft direction of the turbine engine opposite the forward direction.

7. An assembly of a turbine engine, the assembly comprising:

an outer casing including anti-rotation elements; and a nozzle segment coupled to the outer casing, the nozzle segment comprising:

an inner band;

an outer band comprising an inner surface and an outer surface opposite the inner surface;

a first hook extending radially outwardly from the outer surface and extending circumferentially across the outer surface; and at least one nozzle vane extending radially between the inner and outer bands;

wherein the first hook is coupled to the outer casing; wherein slots are defined in the first hook, a first of the slots comprising a first circumferential load surface, a second of the slots comprising a second circumferential load surface, and a third of the slots comprising a third circumferential load surface; and wherein the slots are positioned such that at least one of the first circumferential load surface, the second circumferential load surface, and the third circumferential load surface engages one of the anti-rotation elements while at least another one of the first circumferential load surface, the second circumferential load surface, and the third circumferential load surface does not engage any of the anti-rotation elements of the outer casing.

8. The assembly according to claim 7, wherein the slots are positioned such that the first circumferential load surface engages one of the anti-rotation elements while the second and third circumferential load surfaces do not engage any of the anti-rotation elements of the outer casing.

9. The assembly according to claim 7, wherein the slots are positioned such that at least one of the second and third circumferential load surfaces engages one of the anti-rotation elements while the first circumferential load surface does not engage any of the anti-rotation elements of the outer casing.

10. The assembly according to claim 7, wherein the second and third of the slots are on opposing sides of the first of the slots.

11. The assembly according to claim 10, wherein the slots are positioned such that the first circumferential load surface engages one of the anti-rotation elements while the second and third circumferential load surfaces do not engage any of the anti-rotation elements of the outer casing.

12. The assembly according to claim 10, wherein the slots are positioned such that at least one of the second and third circumferential load surfaces engages one of the anti-rotation elements while the first circumferential load surface does not engage any of the anti-rotation elements of the outer casing.

13. The assembly according to claim 10, wherein the first and second of the slots each span a greater circumferential distance than the third of the slots.

14. The assembly according to claim 13, wherein the first and second of the slots span a substantially equal circumferential distance.

15. The assembly according to claim 7, wherein the first hook spans a circumferential distance across the outer surface between a first circumferential end and a second circumferential end, and wherein the slots together span less than about 25% of the circumferential distance spanned by the first hook.

16. A method of assembling a turbine engine, said method comprising:

coupling a nozzle segment to a support within the turbine engine, the nozzle segment including an inner band, an outer band, and at least one nozzle vane extending radially between the inner and outer bands, the outer band including an outer surface and a hook extending radially outwardly from the outer surface and circumferentially across the outer surface, the hook including slots defined therein, a first of the slots including a first circumferential load surface, and a second of the slots including a second circumferential load surface, wherein coupling the nozzle segment to the support comprises coupling the nozzle segment to the support using the hook, and one of:

engaging the first circumferential load surface with an anti-rotation element of the support, wherein the second circumferential load surface does not engage the support; and engaging the second circumferential load surface with an anti-rotation element of the support, wherein the first circumferential load surface does not engage the support.

17. The method according to claim 16, wherein the hook is a first hook, and the outer band includes a second hook extending radially outwardly from and circumferentially across the outer surface, wherein coupling the nozzle segment to the support comprises coupling the nozzle segment to the support using the first and second hooks.

18. The method of claim 16, wherein a third of the slots of the hook includes a third circumferential load surface, wherein coupling the nozzle segment to the support further comprises one of:

engaging the first circumferential load surface with an anti-rotation element of the support, wherein the second and third circumferential load surfaces do not engage the support; and engaging the second and third circumferential load surfaces with an anti-rotation element of the support, wherein the first circumferential load surface does not engage the support.

19. A method of manufacturing a nozzle segment selectively couplable within a first turbine engine and a second turbine engine, wherein the first turbine engine includes a first support for coupling the nozzle segment within the first turbine engine, the first support having a first anti-rotation element configuration, wherein the second turbine engine includes a second support for coupling the nozzle segment within the second turbine engine, the second support having a second anti-rotation element configuration that is different from the first anti-rotation element configuration, said method comprising:

providing the nozzle segment including an inner band, an outer band, at least one nozzle extending between the inner and outer bands, and a hook extending outwardly from the outer band, wherein the hook is selectively couplable to each of the first support and the second support;

defining a first slot in the hook with a size, shape, and position determined according to the first anti-rotation element configuration such that, when the nozzle segment is coupled within the first turbine engine, an anti-rotation element of the first support engages the first slot; and defining a second slot in the hook with a size, shape, and position determined according to the second anti-rotation element configuration such that, when the nozzle segment is coupled within the second turbine engine, an anti-rotation element of the second support engages the second slot.

20. The method according to claim 19, wherein defining the first slot and defining the second slot include machining the hook.

* * * * *